(12) United States Patent
Lachance

(10) Patent No.: US 7,264,250 B2
(45) Date of Patent: Sep. 4, 2007

(54) SNOWMOBILE STABILIZER

(76) Inventor: Ghislain Lachance, 471 Rue Des Cedres, St Elzear, Quebec (CA) G0S 2J0

( * ) Notice: Subject to any disclaimer, the term of this patent is extended or adjusted under 35 U.S.C. 154(b) by 211 days.

(21) Appl. No.: 10/939,583

(22) Filed: Sep. 13, 2004

(65) Prior Publication Data
US 2005/0212231 A1    Sep. 29, 2005

(30) Foreign Application Priority Data
Sep. 26, 2003  (CA)  .................................. 2442304

(51) Int. Cl.
*B62B 17/02*    (2006.01)
(52) U.S. Cl. ..................... 280/28; 280/28.15
(58) Field of Classification Search ................ 280/601, 280/606, 609, 28, 28.14, 28.15, 608, 11.12, 280/11.18; 180/182
See application file for complete search history.

(56) References Cited
U.S. PATENT DOCUMENTS

| | | | | |
|---|---|---|---|---|
| 3,877,713 A | * | 4/1975 | Mabie et al. | 280/28 |
| 5,344,168 A | * | 9/1994 | Olson et al. | 280/28 |
| 6,012,728 A | * | 1/2000 | Noble | 280/28 |
| 6,971,653 B2 | * | 12/2005 | Takahiko | 280/28 |
| 7,090,229 B2 | * | 8/2006 | Monsrud et al. | 280/28 |
| 7,159,876 B2 | * | 1/2007 | Metheny | 280/28 |
| 7,185,897 B2 | * | 3/2007 | Musselman | 280/28 |

* cited by examiner

*Primary Examiner*—Christopher P. Ellis
*Assistant Examiner*—Brian Swenson

(57) ABSTRACT

A stabilizer comprising three parallel wear blades each of which is made to remain sharpened over a long period of time. The side blades may contain holes to divert the snow and to add roughness when engaging into a ski path, while a rectangular central part runner provides a blade support of a given hardness and holding a central carbide blade of a much higher hardness, thereby permitting passage over rugged hard terrain without wearing the blade support. In soft abrasive gravel, the blade support wears partially thereby leaving a protruding central part, the protruding difference being self adjusting. In the case of the concave ski each side comprises a rectangular edge wear part coupled with a side blade for a total of four wear blades. The rectangular central part may be used alone, along with its central carbide blade within it.

12 Claims, 16 Drawing Sheets

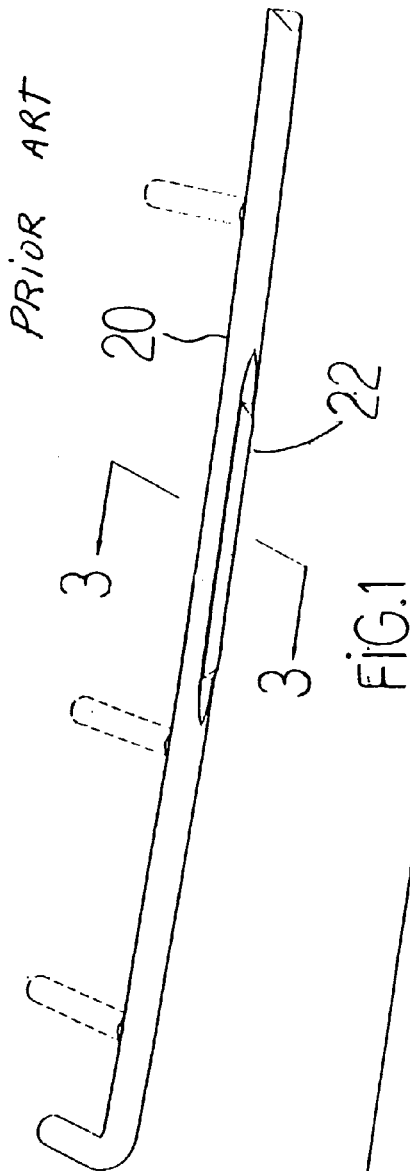
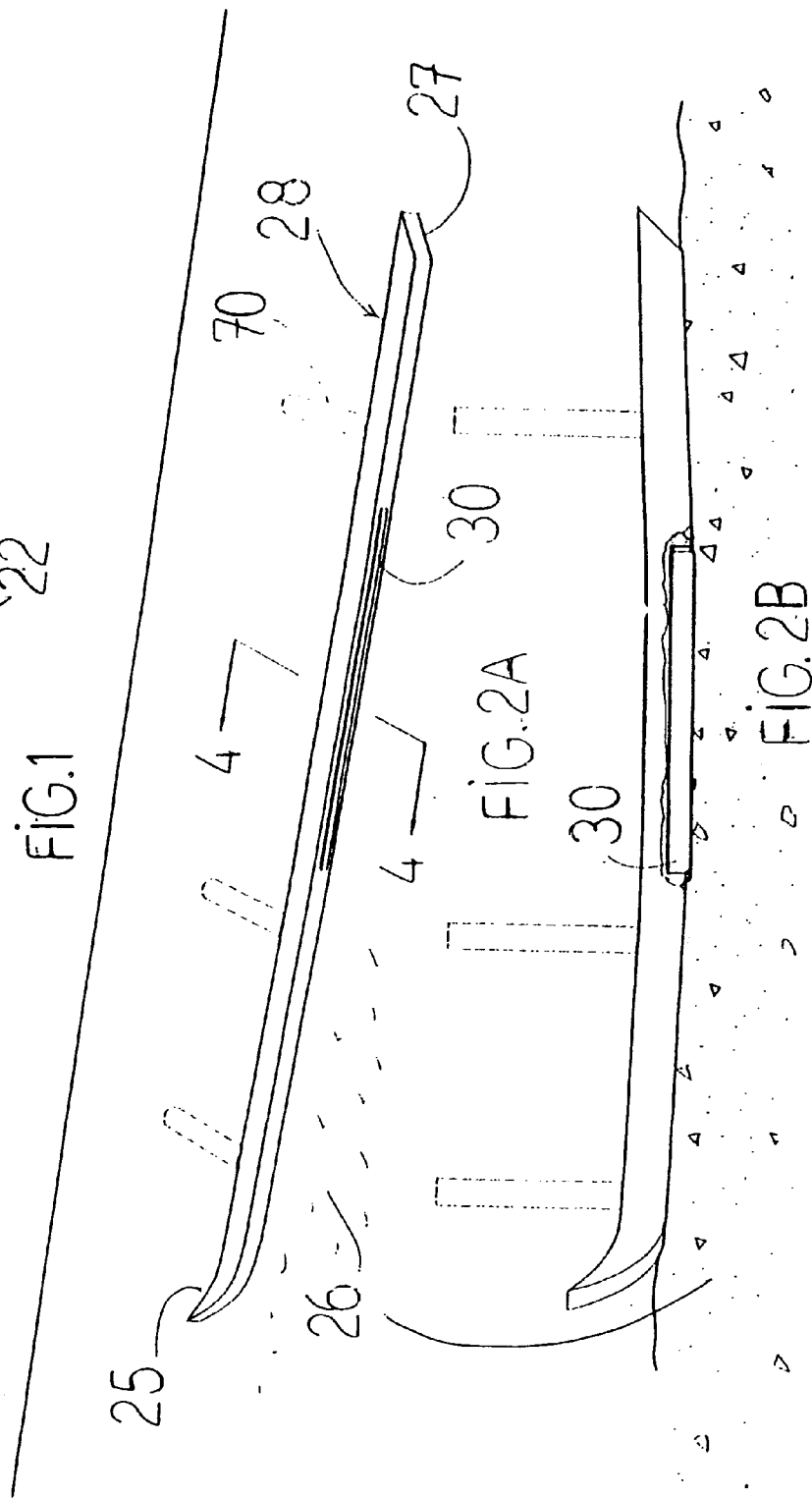

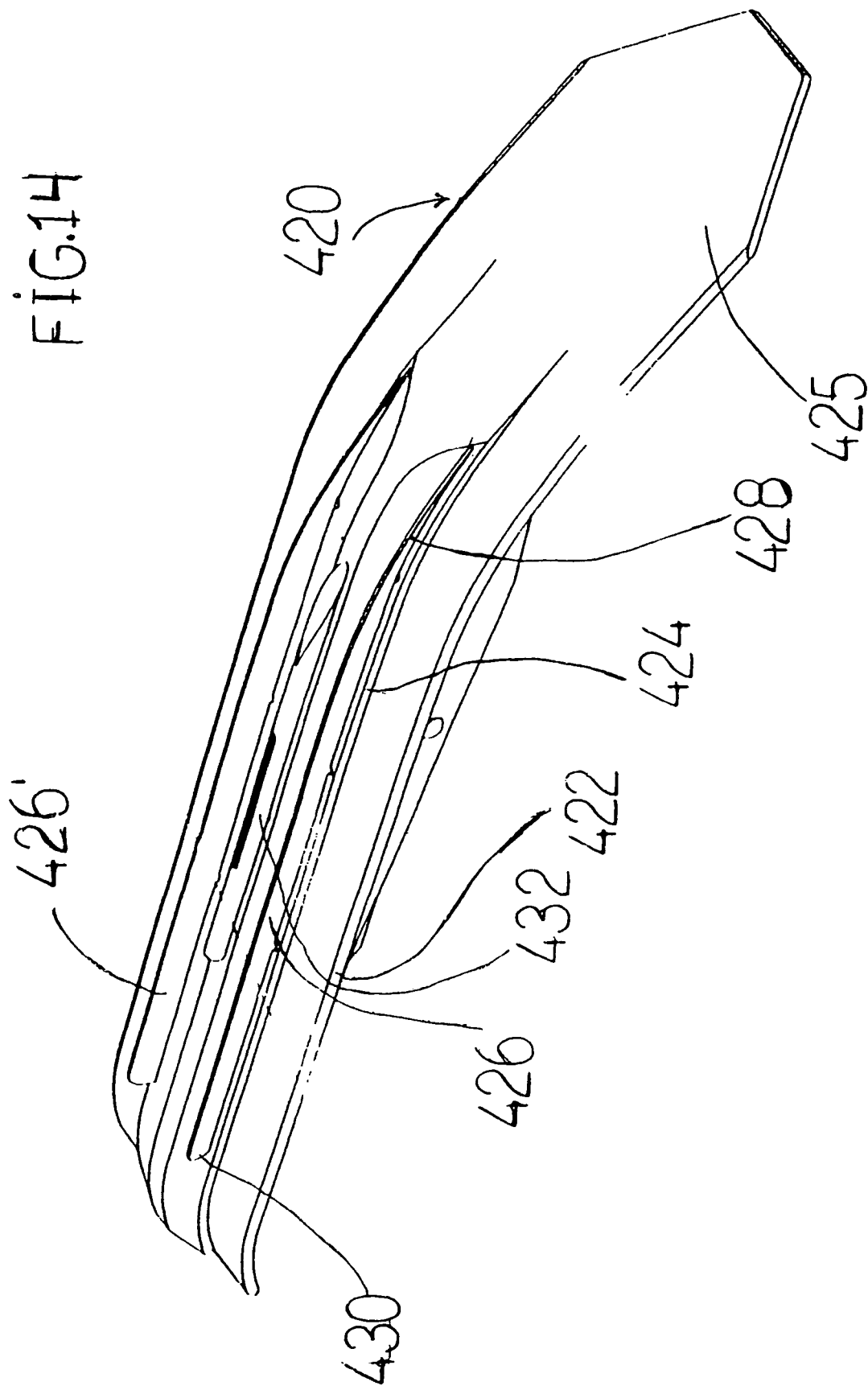

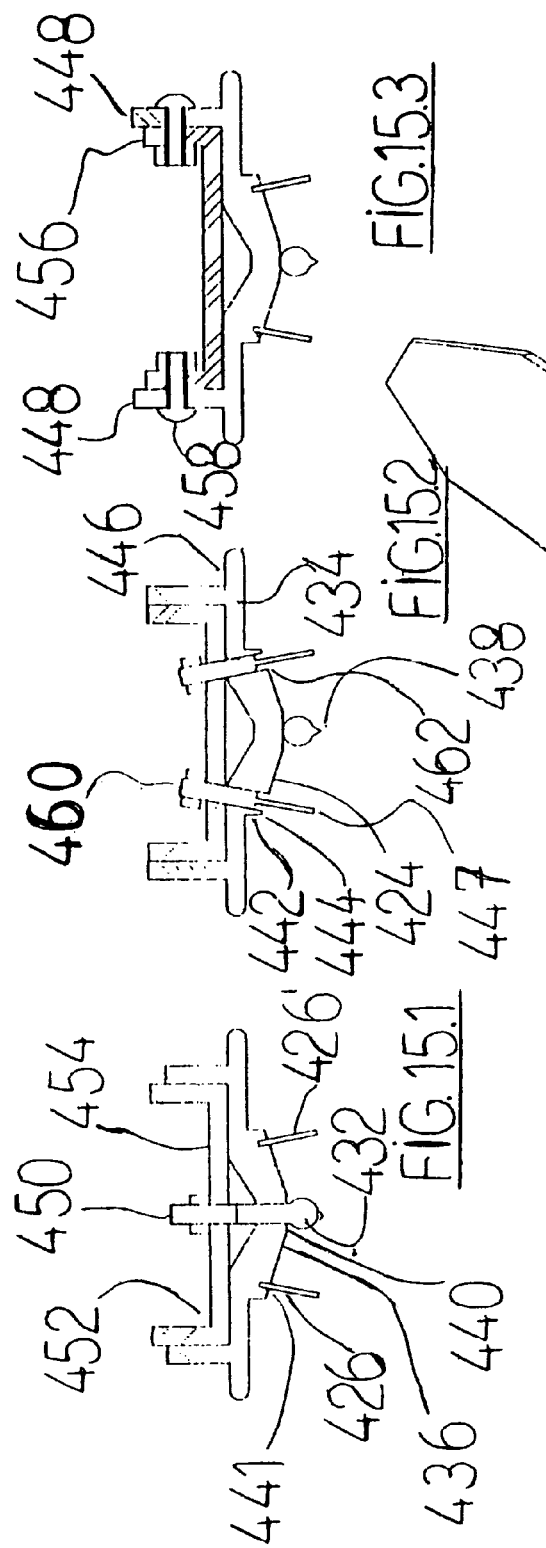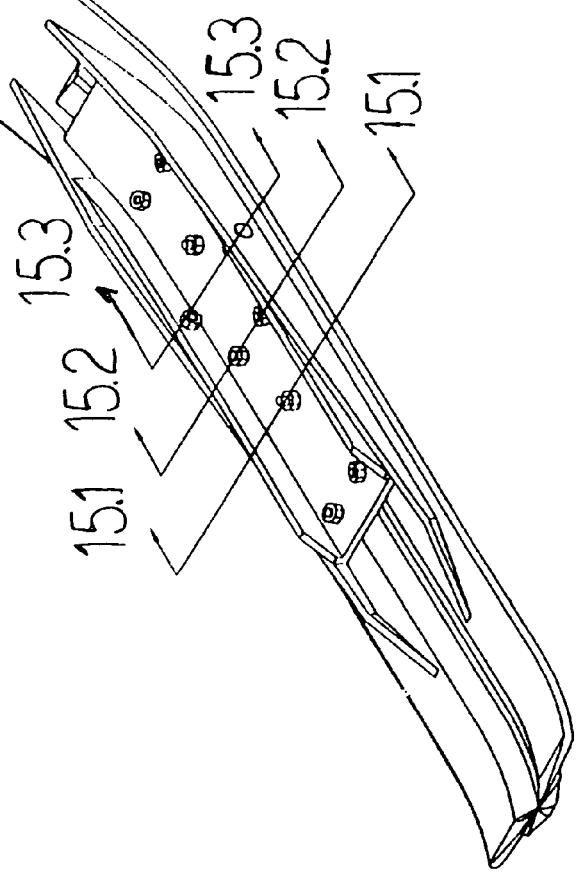

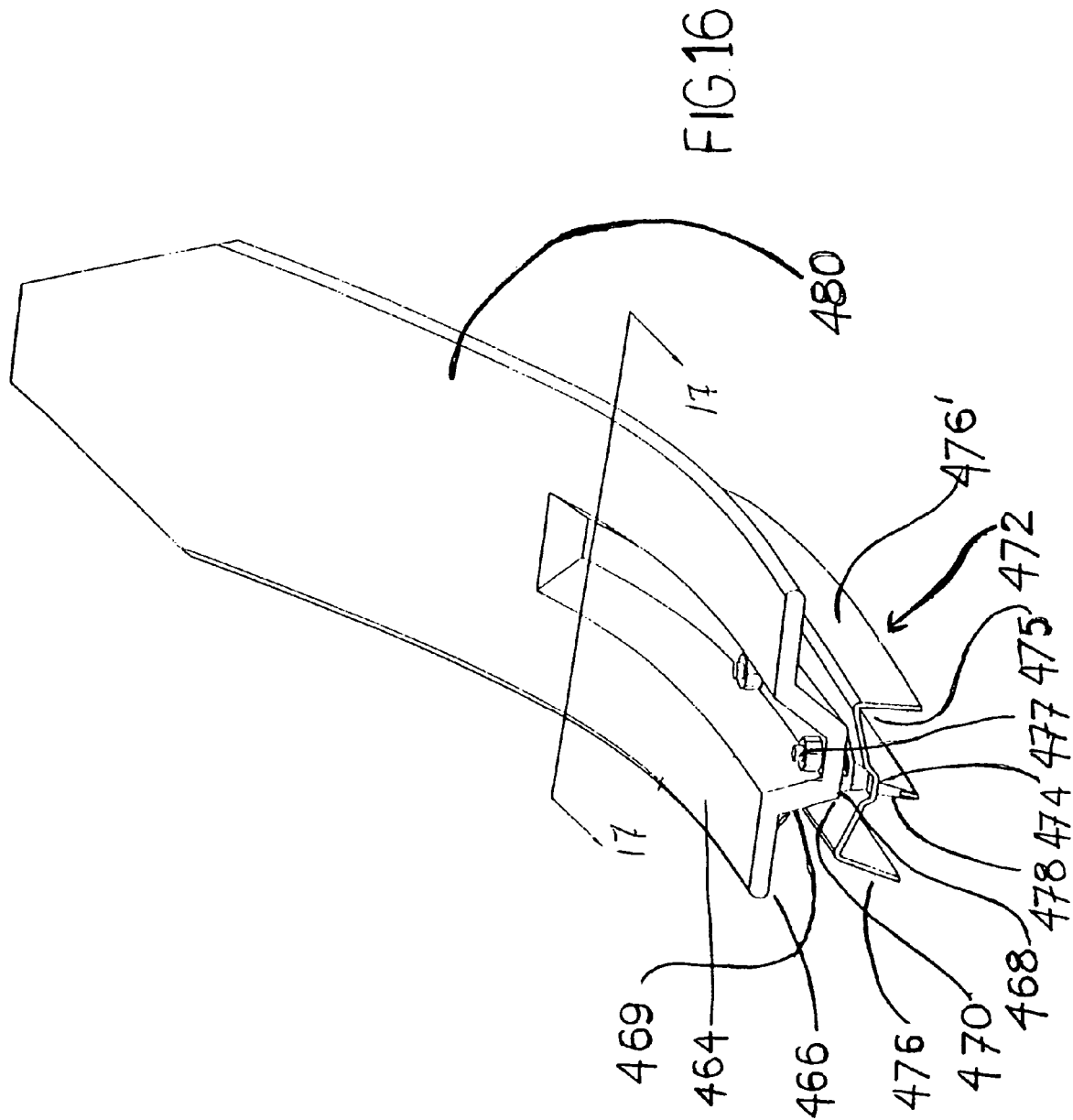

SNOWMOBILE STABILIZER

BACKGROUND

1. Field of Invention

This invention belongs to recreational snowmobile vehicles particularly the ones having one or more skis, and particularly snow ski provided with at least a wear runner and also a blade. This patent proposes a modification to the blade to increase the ski response in soft snowy path to procure an aggressive driving. Furthermore, the invention comprises a modification to a central runner which is self sharpening.

2. Description of the Prior Art

The present invention is an improvement over four inventions from the same inventor so being utilized by other snowmobile skis comprising the same essential characteristics: at least a wear runner and at least a blade. The prior patents from the same inventor which the present invention refers to are the following:

CA 2,388,833; Snowmobile runner.
CA 2,378,638; Snowmobile ski auto-stabilizer, in M or reversed W.
CA 2,388,801; Concave ski stabilizer.
CA 2,300,359 and U.S. Pat. No. 6,520,512; snowmobile ski stabilizer comprising a reversed U channel and a Teflon™ corrector lining the web of the U-channel to provide smooth gliding of the snow between the wings of the U-channel. Centrally of the wings is disposed an existing carbide runner which may be replaced by a self adjusting runner.

A review of the prior art revealed the following patents:

U.S. Pat. No. 5,344,168 Olson Sep. 6 1994; shows a wear runner 50 provided with a carbide bar 56 of the shape of a triangular diamond. The carbide resists until its point 58 is worn more than 10% after which time it does not behave with sufficient sharpness to engage itself into sharp ice, whence the danger of side swaying, the sharp point being dull from wear and incapable of stopping swaying.

CA 2,195,166; shows a wear runner 26 supported in 64, 66, 68 but without added carbide. The element which does the cutting is a break blade 152 which again when dull may no longer cut into the ice.

U.S. Pat. No. 6,012,728; is a snowmobile ski with multiple protruding keels on its underside. The height of the steering keel gradually increases in protrusion, from front end to a central position and may reduce from central position to aft end, but is not high enough to really penetrate snow.

OBJECTIVES

During fast turns of snowmobile skis comprising at least one wear runner and one blade, the snow pressure increases because of the presence of a central wear runner. This phenomenon creates a tendency to lift up the ski during high speed turns. The objective of the present invention is to provide an exit door to the snow by making an aperture in the blade opposite the runner The snow submitted to pressure from the runner gets out by the aperture and the ski no longer tends to lift up by excessive snow pressure. Meanwhile, the adherence of the blade during fast turns and the driving are so improved under these circumstances. To make this aperture useful it must be made oppositely to the wear runner. The wear runner refers to a runner supporting the ski and the snowmobile during passages over a hard surface. The wear runner is obligatory lower than the blade. During passage on a hard surface it is the wear runner that gets into contact with the ground, not the bottom of the blade. The aperture in the blade must be made oppositely to the wear runner otherwise if the blade were to touch a hard surface at a spot (for example a railroad track), the blade would get stuck in the aperture. Being opposite to the wear runner, the edges of the aperture do not touch the hard surface for it is the wear runner which is in contact with the hard surface. A second objective of the invention is that the wear runner be self sharpening, more particularly comprising a rectangular central blade embedded at the center of a support also rectangular and having parallel sides, the hardness of the support being inferior to the hardness of the blade so when the blade slides over a hard surface such as asphalt road, the support is prevented from wearing as long as the carbide resists. During passage in abrasive paths, the support wears more rapidly than the central carbide leaving a difference in height between the blade and the support over all the depth of the wear runner, making it self sharpening, always at a same degree, until the end of the wear out of the runner.

BRIEF DESCRIPTION OF THE DRAWINGS

The present invention will be further understood from the following description with reference to the drawings in which:

FIG. 1 is a perspective of a runner of the prior art.
FIG. 2A is a perspective of a constant use runner
FIG. 2B is a side view of FIG. 2A with partial slit.
FIG. 14 is a perspective of a ski with blades and a runner.
FIG. 15 is a top view of the ski of FIG. 14.
FIG. 15.1 is a section according to line 15.1-15.1 of FIG. 15;
FIG. 15.2 is a section according to line 15.2-15.2 of FIG. 15.
FIG. 15.3 is a section according to line 15.3-15.3 of FIG. 15.
FIG. 16 is a perspective of a replaceable runner.

DESCRIPTION OF THE PREFERRED EMBODIMENT

Preferred embodiments of the invention are illustrated in the figures wherein the same numbers identify the same characterizing elements.

FIG. 1 shows an original runner 20 provided underneath of a carbide bar (stabilizer) 22 having a diamond point shape.

Figure 4:
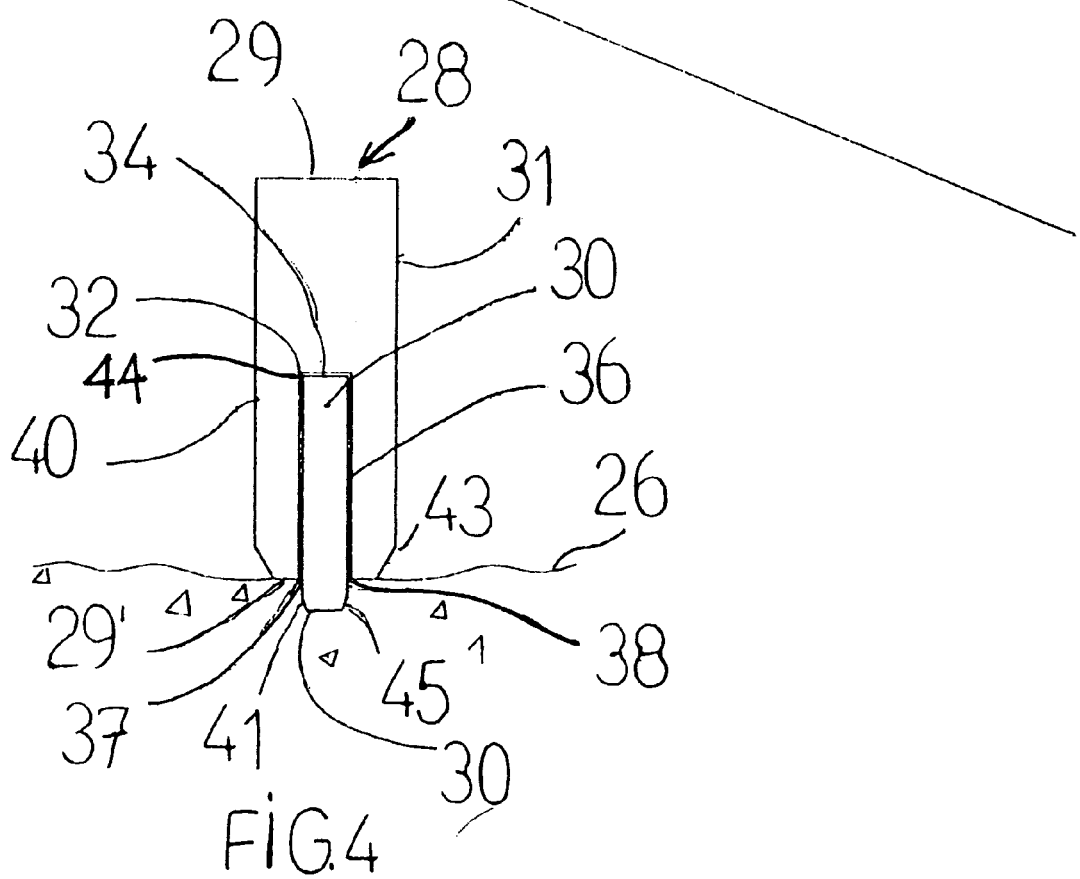
FIG. 4 is a cross-section according to line 4-4 of FIG. 2A

FIG. 2A shows a wear blade runner 28 in carbide having a curved part 25, in the front, a rear beveled part 27 and comprises in the interior, a thin sided carbide 30 acting as a knife blade penetrating snow, ice and rough abrasive surface 26. The constant thinness is to give superior driving adherence, on hard, icy snowy surfaces. In FIG. 2A the wear blade runner 28 in carbide may preferably be rectangular, slightly inclined and sharpened (FIG. 4). In FIG. 2B the profile of the thin carbide 30 appears in the slit.

Figure 3:
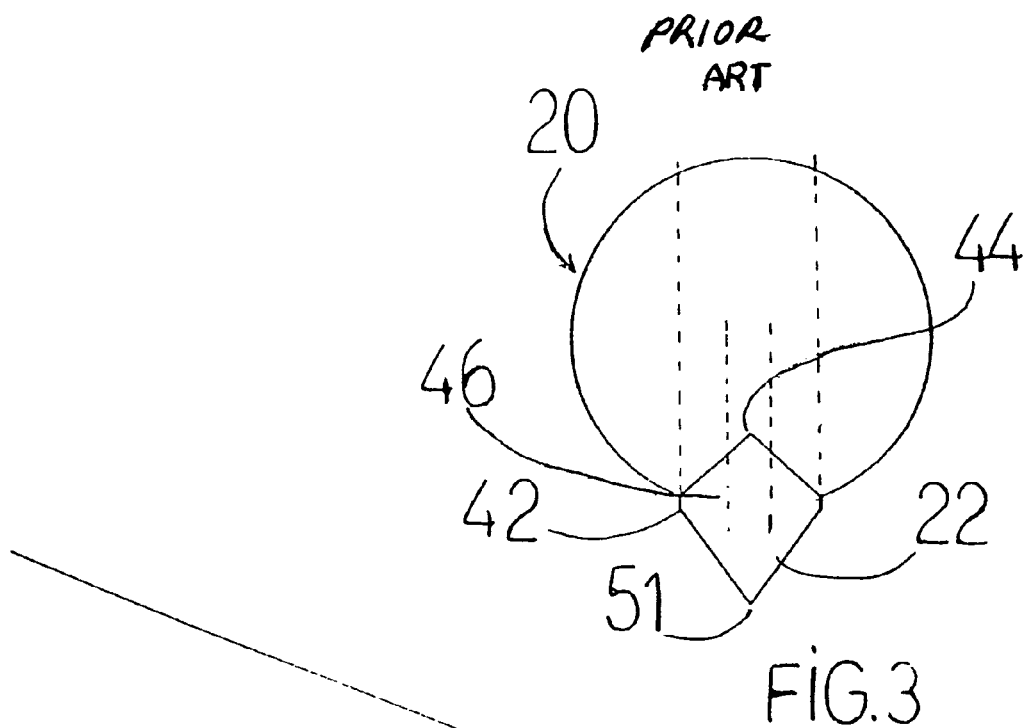
FIG. 3 is a cross-section according to line 3-3 of FIG. 1.

FIG. 3 shows for prior art the original runner 20 and the carbide bar 22. This carbide bar has a point 51. In operation after a certain while, the end of the point wears out until a point maximum level of use 42. The depth 44 maintains the carbide bar in position. At that very moment there is no biting by the carbide because the carbide has enlarged. A maximum wear is reached at a shoulder 46 where the cutting efficiency is null on ice or hard surface, the wearing out continuing on the runner seating surface as far as half of the runner circle. Dotted lines show the relative thinness of a proposed side carbide (FIG. 4).

FIG. 4 shows a wear blade runner 28 made in a rectangular shape: short sides 29, 29' oriented top to bottom and large sides 31 disposed perpendicularly of the side of a ski. The runner 28 is of two parts, namely a support 40 of the above dimensions and a thin sided carbide 30 embedded in a sheath 32. The sheath has a thin side 34 and two long sides 36. Between the sheath and the flat carbide there is barely enough space to pass through a silver foil 37 to weld the carbide in place. After wear out on hard roads there is a new position 38 of the carbide; after wear out following frequent passages on abrasive paths and on icy ground filled with rocks a new position of the support 40 is found at depth 44. The wear out position of the support 40 attaining the end of the carbide. The hardness of the support material is of 0 to 50 Rc but the hardness of the thin sided carbide 30 is of 60 to 80 Rc. A height of 1" is possible for the large side 31. The bolts 70 (FIG. 2A) serve to unify the wear blade runner 28 to the original ski. One sees a curved end 25 that is also sharp in the back 27 until the beginning of the curving part. The side carbide 30 can have typically a thickness of short side 34 of about 1/16". It is possible to increase the thicknesses for more durability but with less efficiency. The thickness of the web 29 is twice to four times the thickness of the central carbide blade, to support well the carbide blade.

In use the turning of the skis equipped with a wear runner causes the digging of a channel along the guided direction and a better adherence of 66% more than a carbide runner with diamond point when reaching the maximum level of use 42; (FIG. 3) the utilization of the runner provided with the thin sided carbide 30 being the third of the original carbide bar 22 procures much more adherence and less friction when sliding. The overlapping of the point creates an excess 41 corresponding to 1/16" of sliding depth in the ice so the overlapping of the original carbide bar corresponds to 1/4". As well, the wear blade runner itself corresponds to 1/4" to 3/16 large but the original runner is 7/16 to 1/2" large and round. A round runner does not offer a cutting easiness but gives more resistance when sliding, especially for its largeness (7/16") is almost the double of the wear blade runner 28. All restriction to sliding by a large runner causes way less adherence, less cutting easiness, a loss of speed, an increase in gas consumption, what is not useful for the consumer. Therefore, it is preferable to add a blade bevel 45 at the end of the blade, combined with a runner bevel 43 at the end of the runner.

Figure 5:
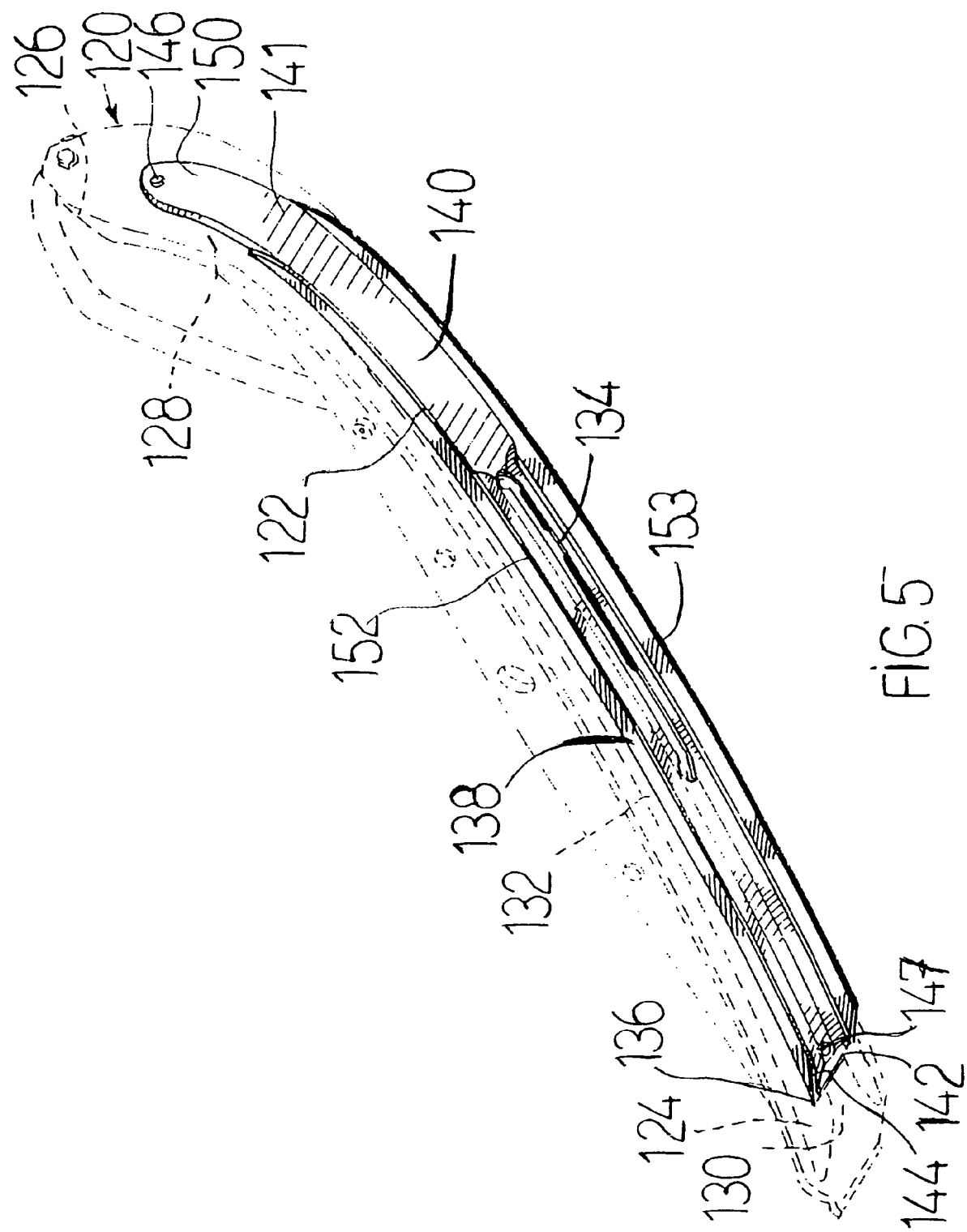
FIG. 5 is a perspective of a ski equipped with a stabilizer.

FIG. 5 shows the underside of a snowmobile ski 120 in—dotted line—, fitted with a stabilizer 122. The stabilizer 122 starts on the rear end, just before the curved part 124, and stretches to the front end 126 of the ski 120, just before a strong curve 128. The stabilizer 122 is placed on a lowered center channel 130 located in the middle of two carrying sides 132. The lowered center channel 130 receives a carbide bar 122 that protects the ski when sliding over asphalt. The carbide bar 122 also helps veering when moving on icy surface. The stabilizer 122 has a U-shaped section 136 with wings 138, pointing downward, in order to penetrate snow. Section 136 is made of metal. A corrector 140 is placed on a web 142 of the U-shape section 136 and comprises a bend 144. A resilient section 141 bears against the front end of a steel stabilizer 122 when the front end 126 of the ski is bent. The corrector 140 may be made of Teflon™ or Tivor™ type material or of UHMW polyethylene plastic. Front and back bolts 146, 147 fix the corrector 140 and the stabilizer 122. The wings 138 are two (2) to three (3) mm thick, preferably 2 mm and are 19 mm high. The corrector 140 has an extension 150 at the front and stretches to the front end 126 of the ski.

It is possible to use an L-shaped channel with the short part of the L replacing a wing of the U but it is preferable to have the carbide bar 134 located between the two wings 138. The carbide bar 134 not only protects when crossing on asphalt roads but facilitates turning when on icy roads because it supports the ski on a single point. A typical height of wing 138 is 18 mm with variations from 6 to 50 mm. The width of the web 142 may be from 25 to 150 mm with typical value at 40 mm. The carbide bar 134 may be of different lengths in order to fit the skis being used by a snowmobile manufacturer. The wings may be covered by carbide plates 152 such as appears on one wing or by a spread of carbide or diamond powder 153 such as is shown on the second wing.

Figure 6:
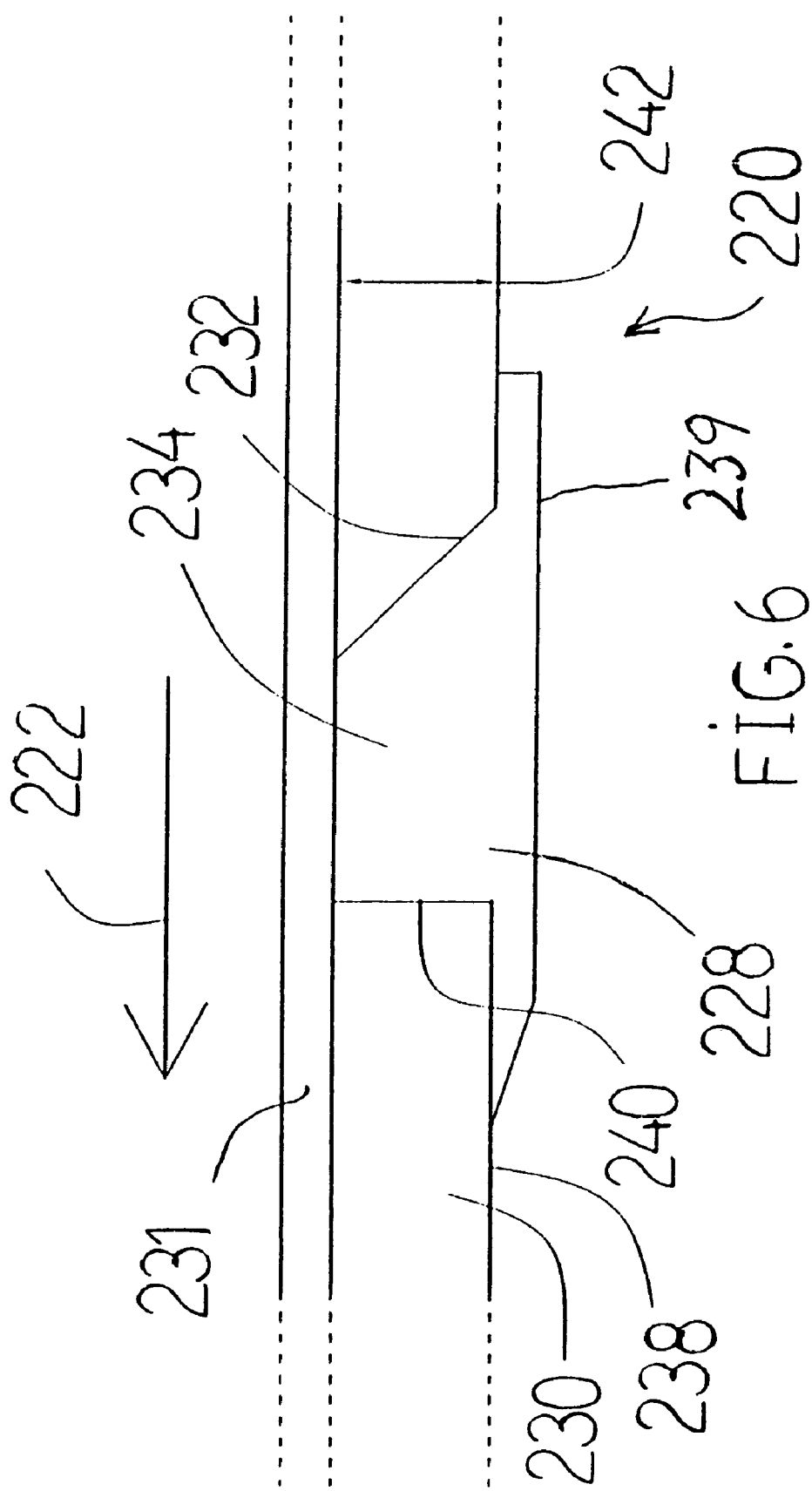
FIG. 6 is a side view of an aggressive stabilizer.

FIG. 6 shows an aggressive snowmobile ski 220 comprising a ski support 231, a blade 230 provided with an aperture 234, and a wear runner 228. One sees also the wear runner 228 exceeds the blade 230 and the blade point 238. This way the runner is lower than the blade; the blade will rub to a hard surface, but the blade point 238 will stay upwards. It is obligatory that the ski of the present invention be provided with such a wear runner where the blade point 238 or a rear edge 232 of the aperture would be damaged by crossing for example a railroad track. The aperture is formed of the rear edge 232, the front edge 240, and can also be formed of a superior edge localized between the blade point 238 and a blade support leaning on a ski. The direction of the snowmobile 222 is also illustrated that is why the angle of the rear edge 232 is less inclined than the front edge, the front edge could be cut at 90° so be the rear edge could be at 90° to facilitate the passage of rocks or other hazards. In the present illustration, the aperture corresponds to the total width of the blade 242, that is why there is no superior edge. Such opening width is preferable because it gives less resistance to the exiting of the snow in sudden turns.

Figure 7:
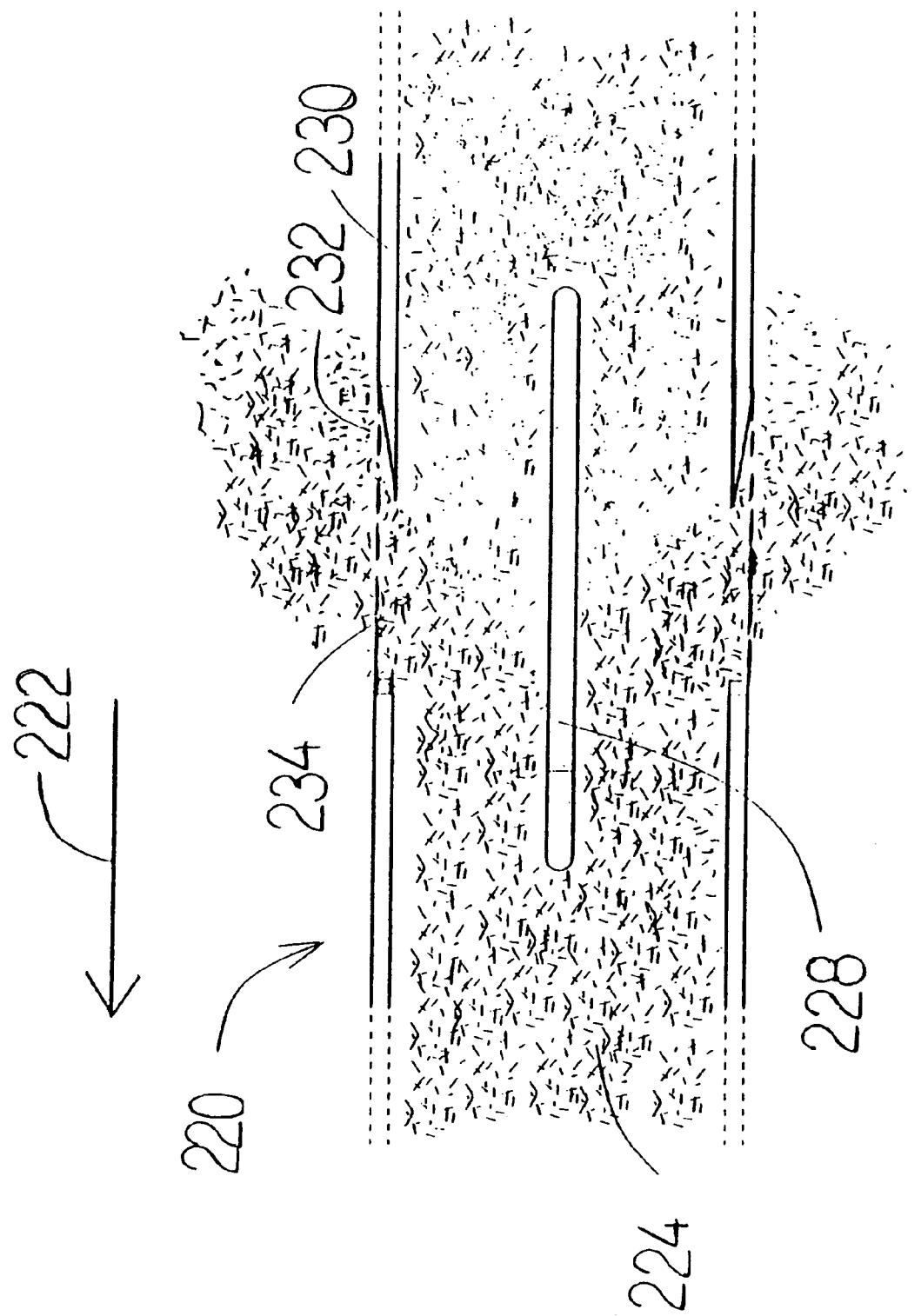
FIG. 7 is a bottom view of a diagram of the ski of FIG. 6.

FIG. 7 shows the aggressive ski in action. The ski slides on the snow 224, the front appearing at the left. When the wear runner 228 gets into contact with snow, the snow is compressed on all the height of the blade 230 including the rear edge 232 in slope and the pressure can provoke a slight lifting of ski. In the shown ski, the apertures 234 permit the evacuation of snow. The snow pressure under the ski is re-established and the ski will no longer have the tendency to lift. This compensation effect can be compared to the aquaplane effect under tires of motor vehicles.

Figure 8:
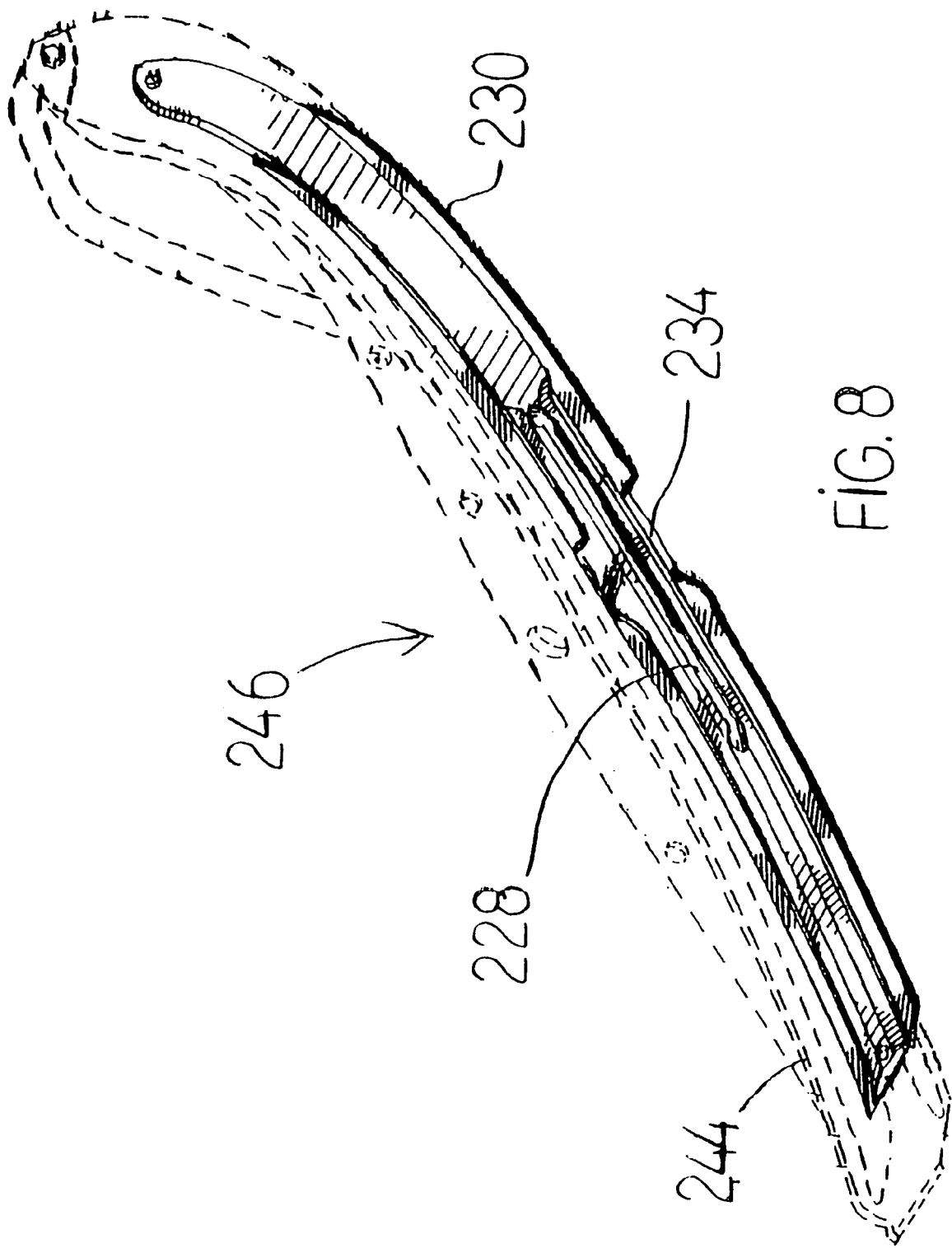
FIG. 8 shows a perspective of the aggressive of FIG. 6.

FIG. 8 shows an embodiment of the invention on a snowmobile ski provided with a steering stabilizer 246 (CA 2,300,359, of the same inventor), wherein a snowmobile ski 244 is shown in—dotted lines—. One sees an aperture 234 practiced in the blade 230, and the aperture is situated opposite the wear runner 228.

Figure 9:
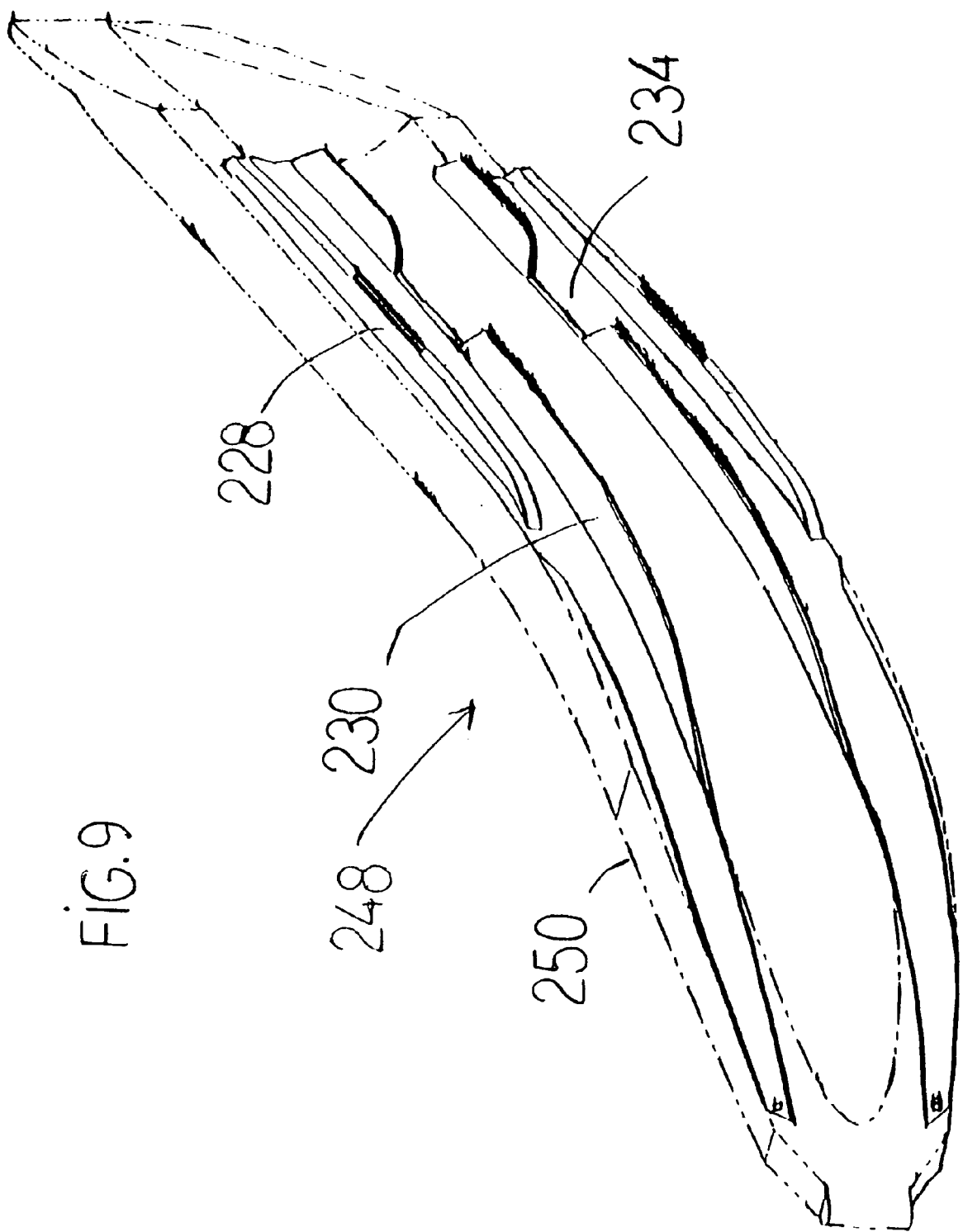
FIG. 9 shows an embodiment of the invention with a concave ski.

FIG. 9 shows an embodiment of the invention to a concave snowmobile ski provided with a concave ski stabilizer 248 (CA 2,388,801, of the same inventor), wherein a concave ski 250 is shown in phantom lines. One sees an aperture 234 practiced in blades 230, and the aperture is oppositely located to the runner. The rear edge is rounded instead of showing a 45" slope. In the case of the concave ski, the evacuation of snow is made towards the inside of the ski; the pressure of snow is decreasing for the concavity yielding a greater volume.

Figure 10:
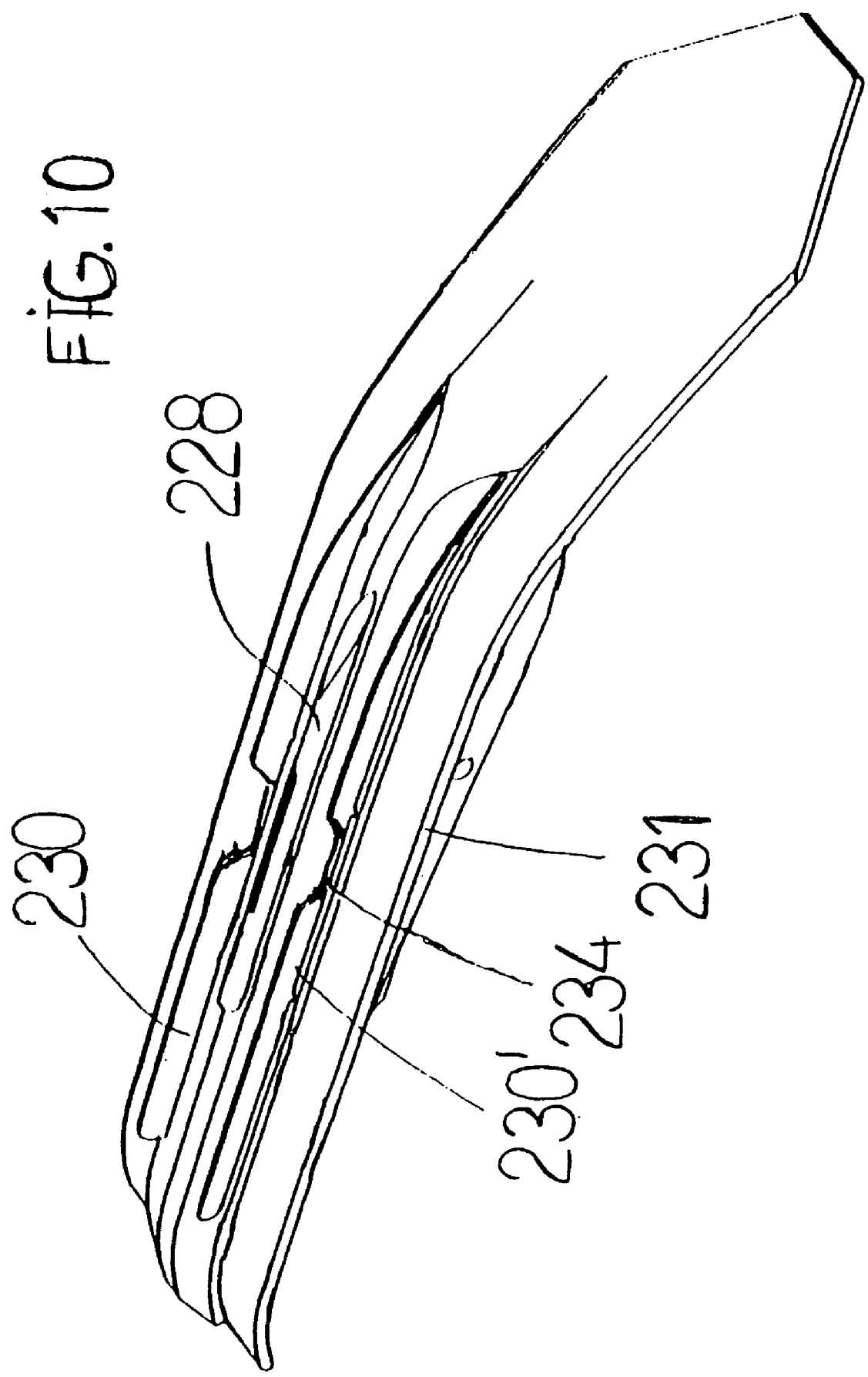
FIG. 10 shows two independent blades and a central runner.

FIG. 10 shows an independent blade 230, separated by the runner 228 and mounted on a support 231 which is the sliding part of a ski.

Figure 11:
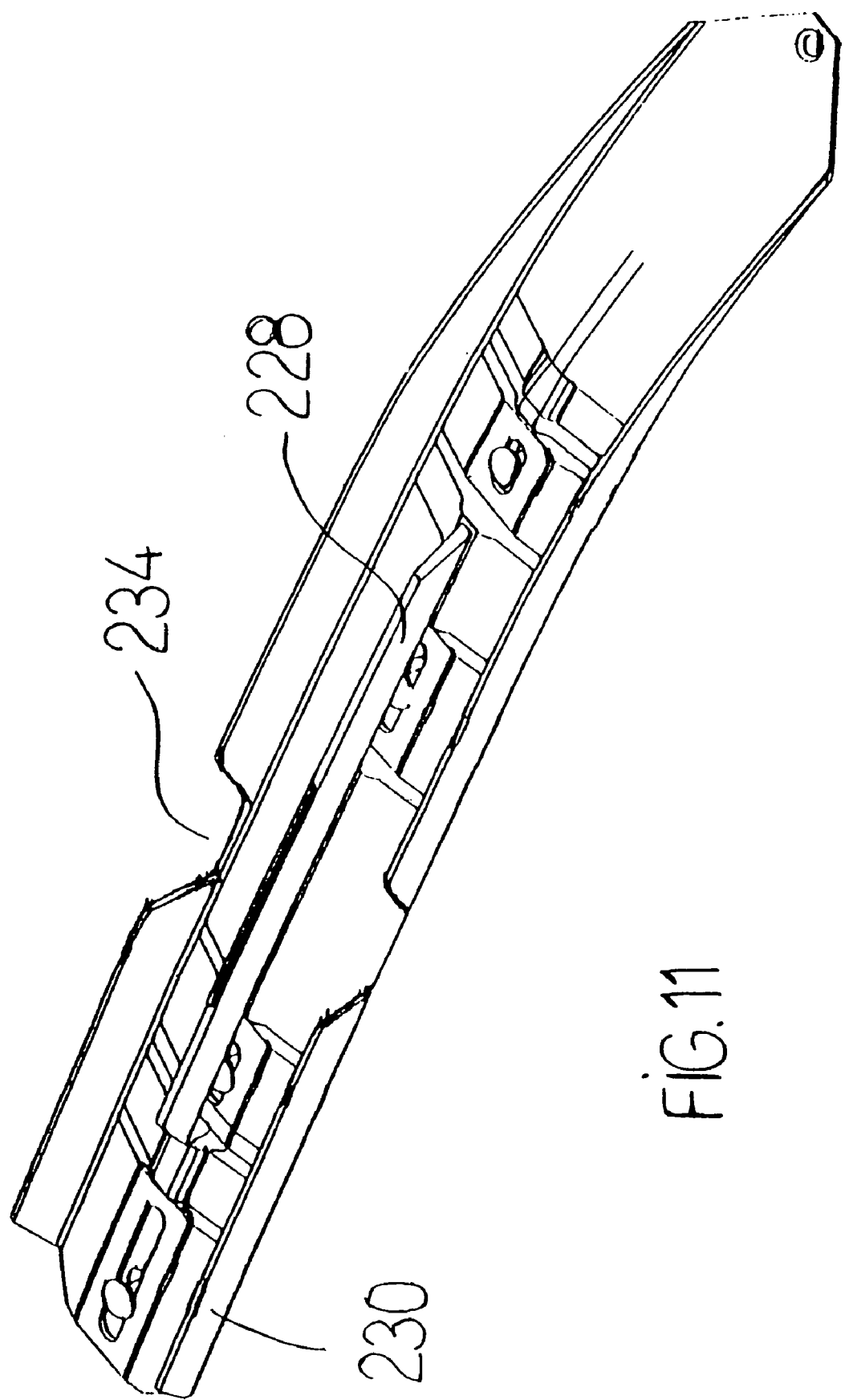
FIG. 11 shows two blades and a runner made of one only piece.

FIG. 11 shows blades 230 and a central runner 228 all incorporated in one piece bolted on the ski. One sees the aperture oppositely to the central runner.

Figure 12:
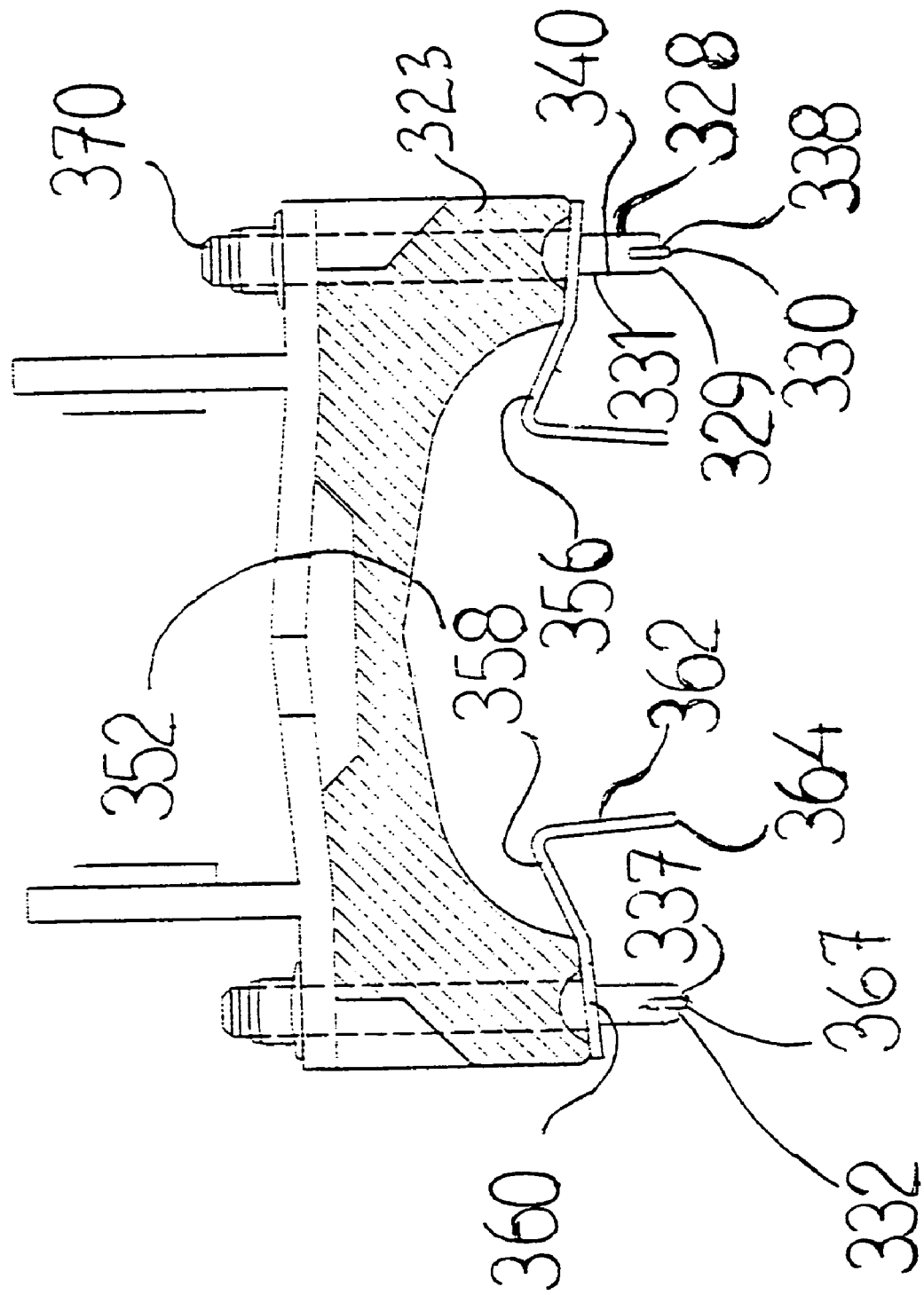
FIG. 12 is a section of a stabilizer adapted to a concave ski.

FIG. 12 shows each side of the concavity 352 towards the left of a cut reversed U-section forming a web 360 and a blade 358 making a pair with a right reversed U forming a web 360 and a blade 356. A pair of carbide runners 328 appears to the receptacle limits 354 and to a web 360 under a ski. The carbide runner is attached with bolts 370 and comprises a support 340 and a thin sided carbide 330. The support comprises a large side 331 and a short flat side 329, wherein there is a sheath 332 containing the thin sided carbide 330. One sees the wear out position, either the carbide position 338 or the position of the support 340. The support is built in softer steel such as 50 Rc and permits to disengage faster than the carbide at 80 Rc to allow the carbide to be always out, ready to cut. One sees between the position of the sheath 332 and the position of the large side 331 a silver foil 337 to weld the carbide to the support. The exceeding carbide 367 protects the blade 358, 356 when it slides on a hard surface as asphalt, and keeps the cut helping the runner 328 to turn in digging in a rough or rugged surface until the wearing out of the carbide and then the support at its turn, is altered by abrasion. An active member 362 meant to draw a furrow in the snow by means of a marker 364 located at its bottom end. The carbide runner can endorse several shapes. It can be round, hexagonal, square or rectangular such as shown. The bolt 370 passes through the wing 323. There is a hole in the web permitting the passage of the bolt. When the bolt is welded to the runner, it passes the web into the receptacle, through the wing to reach the ski.

Figure 13:
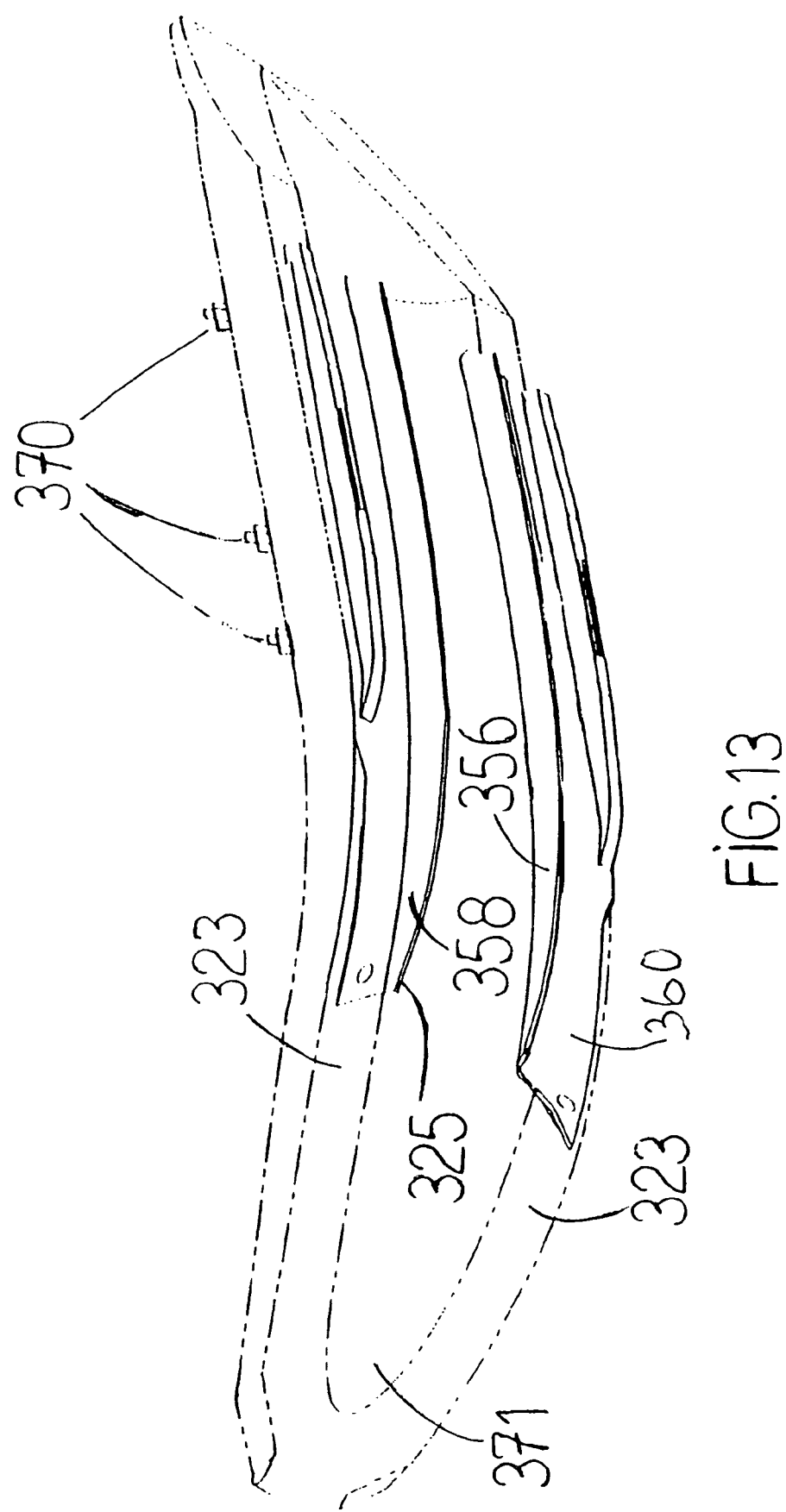
FIG. 13 is a perspective of a concave ski having a stabilizer.

FIG. 13 shows a typical ski 371 possessing bearing sides. The wings 323 are typically 1" thick, 45" long and ¾" large. The blade 356 is placed at an angle of about 80 to 90° and is overhang by the web along all the sliding distance of the ski, about 24". The bolts serve to join the moveable runner to the concave ski 371. A curved end 325 is also sharp; and correspondingly at the back until the curved part.

It is possible to increase the thickness for more durability but with less efficiency. The web thickness is corresponding to the blade for it may come from the same curved part. The three pieces, the web 360 and the internal blades 356, 358 come from tempered steel at 30 to 60 and preferably 50 Rc. The runner is bolted 370 to the web and to the ski and it is preferably of the self adjusting type. The concavity constitutes a dome space permitting the evacuation of the snow moved by the blades.

FIG. 14 shows the bottom side of a snowmobile ski 420 having sides 422 and a thick central section 424, provided with a curved part 425 at the front. A pair of external knives 426 appears at the limit of the central part 424. These knives end at a beveled front 428 and a straight rear 430. The central part 424 receives a central runner 432 protecting the ski when sliding on a hard surface. The central runner 432 helps also the turning on icy or snowy surfaces.

FIG. 15 is split into cuts 15.1, 15.2 and 15.3. In the embodiment of FIG. 15 shows a central runner 432 taking different shapes. It can be round, square, hexagonal or rectangular. The ski possesses bearing sides 434 typically of ¼" thick, 45" long and 1¼" large. The thickened section 424 includes two slope sides 436 of approximately 1" long of each side to bind to a flat part 440 that supports a runner. This runner can be overhang by a carbide runner to form a hard foot 438. The knife 426 is placed at an angle of 80° and comes into the sheath 441 receiving a blade 426' inclined. The knife 426 possesses a low limit 447. A thickened region 424 comprises also a side 442 at 90° with a bearing side. A height of ¾" is possible between an edge 444 and a bearing side 434. A top 446 is relatively flat but for the external reinforcements 448 disposed above and toward the exterior. A central reinforcement 450 is disposed centrally and oppositely the central runner 432. Pockets 452 disposed near the central reinforcement 450 help to make the structure lighter. An aluminum U-channel 454 is disposed on the top 446 and join the reinforcements 448, 448', 450 to strengthen the ski. The U channel 454 has plies 456 joining the external reinforcements 448 by means of bolts and rivets 458. A knife attach 460 takes the shape of a bolt, penetrates the U-channel 454 and the thickened region to reach the knife blade by a cavity 462 wherein passes a welded bolt to a place on the knife. This is repeated in various places to give the knife the strength to maintain in place.

FIG. 16 shows an original ski 464 comprising a pair of wing parts 466 and a low part 468. A low corner 470 defines a limit between a low flat part 468 and a curved part 469 forming a bearing part joining the wing part 466. A moveable runner 472 from fore to aft ends is disposed on the sliding part of the ski and particularly under the low part 468. Bent blades 476, 476' are disposed towards the exterior and a central wear runner 478 is welded to a web 474. The central wear runner can be slightly sharpened towards the bottom or take a rectangular shape. Between the central wear runner 478 and a bent blade 476, there is a sharp angle 475 forming a sharp interior of a M. Nuts 477 serve to unify the moveable runner 472 to the original ski 464. A succession of deformities creating central plates 494 (FIG. 17) in the central line of the moveable runner 472 oppositely to the bolts to position to a bolt head 502 to (FIG. 18). One sees a curved end 480 which is also sharp and similarly to the back until the beginning of the curved part.

Figure 17:
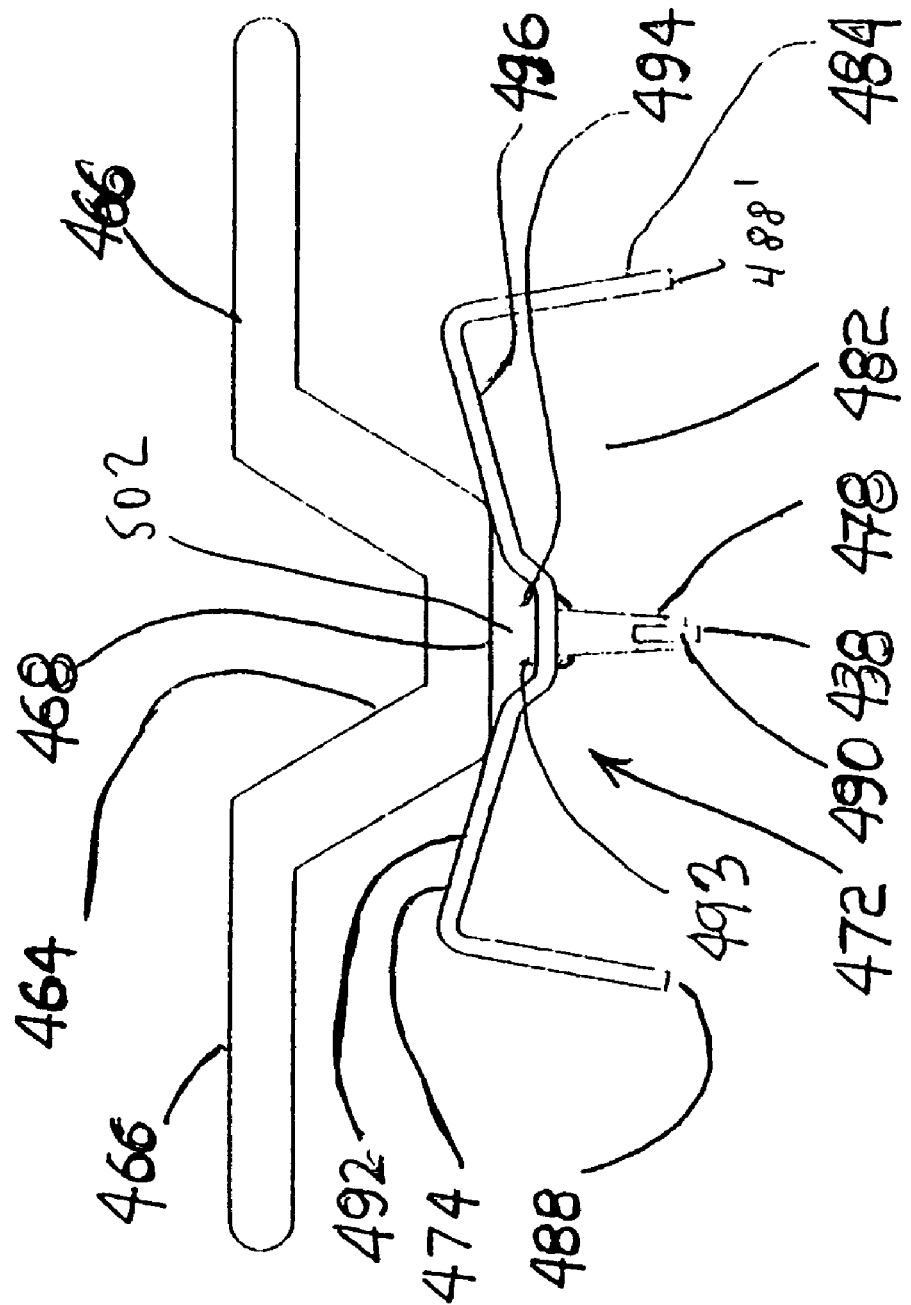
FIG. 17 is a section according to line 17-17 of FIG. 16
Figure 18:
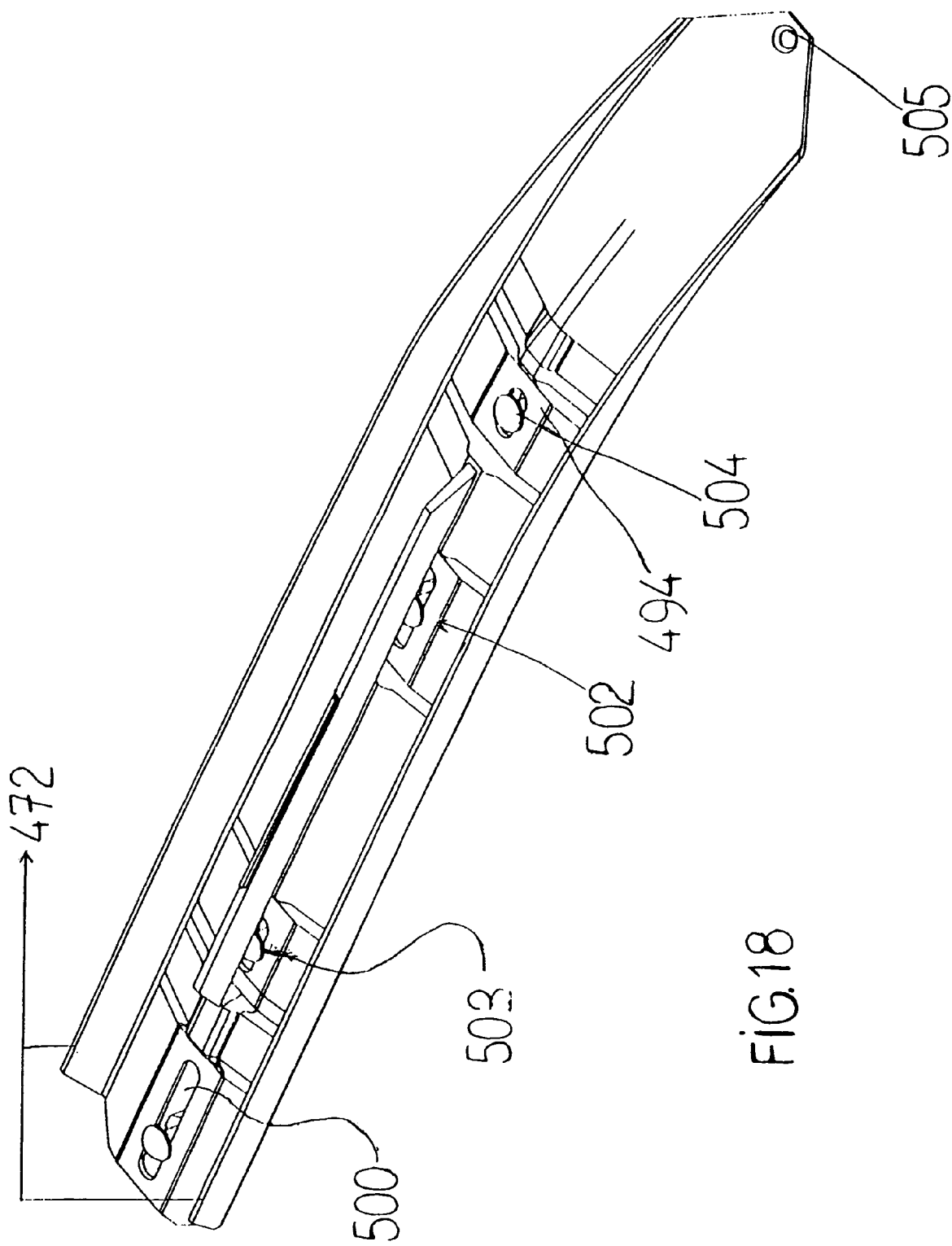
FIG. 18 is a perspective of a runner seen from underneath.

FIG. 17 shows an original ski which was added the original runner 472. In looking at the moveable runner one sees an aperture 482 about 2¾" and a sharpening slope 484 of about 80° to give a reversed W shape look. The slope can also be of 90° in case of a simple M. The knife can also have thickness 488 of ¹⁄₁₆". It is possible to increase the thicknesses for more durability but less efficiency. The web thickness 492 is of same caliber of the knife because it may come from the same curved metal part. The web and the external knives, come from tempered steel at 30 to 60, preferably 50 Rc. The central runner 478 comprises a hard foot 438 such as FIG. 4 runner 28 and carbide 30, the runner being welded through the web and to the central plate 494 to prevent wear out of the weld. Central plates 494 are large enough to receive the flat part of the bottom of the ski 468 which can be 1¼" large where it has bolts. The web 474 is ended by a turned up point 496 defining a V space to let pass the snow moved by the central runner. At a limit, the web could be slightly concave or even flat, but if it would become convex it would mean a loss of efficiency for the portion of the useable surface to place the snow during passages of the central wear runner 478 would not be large enough. The area of the runner may be ½" long by 5/16" wide. At the end of the central runner it may appear a sharpening 490 to give more penetration. The central runner acting as a blade can be equal or lower than the knives because in use it will wear out until the three blades 488, 488', 478 are equal in height for they are equally used for a better cutting efficiency. A carbide 438 helps protecting from wearing out; the knives 426, 426' which support the central runner 478.

FIG. 18 shows a moveable runner 472 seen from the bottom turned upside down: one sees a number of slits 500 to receive bolts and one perceives also a flat piece 502 and a hidden bolt head 503. At the front the bolt has an observable bolt head 504. A hole 505 is drilled to fix, by means of a bolt, the end of the moveable runner.

SUMMARY

A self sharpening runner meant to be fixed to a slide ski face, the self sharpening runner comprising:
- a rectangular wear blade runner 28 having a short side 29 oriented upward on the slide ski face, two large sides 31 disposed perpendicularly of the slide ski face and a low short side 29' oriented downward against the ground, the low short side comprising a sheath 32, the wear blade runner having a first hardness;
- the sheath having two parallel sides placed from the slide face until a depth 44, the sheath receiving a blade 30 having an excess 41 comparing to the slide ski face and having a second hardness higher than the first hardness so when the self sharpening runner travels on a hard surface as asphalt or ice, only the blade is in contact and exposed to wearing out, but when the self sharpening runner travels on a penetrable surface as snow blend with salt, sand, or gravel, the blade penetrate the surface and the blade support is also exposed to abrasion;
- successive passage of the blade 30 and the sliding ski face on a hard and abrasive surface as asphalt roads causing partial abrasion only on the blade and the passage of the blade and the sliding ski face on abrasive matter a little less harder causing penetration of the blade, its wearing out, and meanwhile the wearing out of the low short side of the blade support of the first hardness; for the first hardness of the blade support is inferior to the blade hardness, the excess 41 which is responsible for an efficient cut in the hard matter is maintained until complete wearing out of the blade when a ratio of the first hardness compared to the second hardness is chosen for successive passages on hard abrasive surface and penetrable surface, completing a self sharpening and a constant and even cut until complete wearing out.

The wear blade runner is of a thinness permitting a penetration of its rectangular shape in trail hard snow and the blade is about 2 mm smaller than the low short side and possesses a thinness making a sharp knife in an ice trail meant to create a deep furrow and to procure an efficient direction while driving until complete wearing of the runner.

The self sharpening runner having a hardness ratio of the blade comparing to the support between 1.3 and 2.4. When mild steel is used in the support the carbide blade must be at least 50 Rc.

The thickness of the blade being a third of the width of the wear blade runner.

The blade is about 2 mm large, when the wear blade runner is about 6 mm.

The self sharpening runner used in combination with a stabilizer 122 having a front 126 and a long body installed longitudinally under the slide ski surface, the stabilizer comprising:
- a pair of cutting elements comprising two thin blades disposed externally of the snowmobile ski runner, all three elements being positioned below the ski, with the centre element comprising means for bearing over hard passages for preventing wear of the thin blades,
- stabilizer comprising means at the front 126 to flatten snow between the two thin blades,
- the stabilizer comprising a slide surface for longitudinal sliding between the two blades;
- the combination of the three cutting elements in the flattened snow forcing the snow along the longitudinal sliding, thereby diminishing side swaying.

The self sharpening runner used in combination with:
- a snowmobile ski 220 comprising at least a blade 230 and at least a wear runner 228, the blade comprising at least an aperture 234, the aperture situated oppositely or slightly towards the front or towards the back of the runner when seen from the side.

A method to improve the adherence of snowmobile skis having at least a runner and at least a blade during fast turns comporting at least the following step:
- creating at least an aperture oppositely of at least a runner in at least an existing blade.

A snowmobile ski 220 having at least a blade 230 having a width 242 having a blade point 238, the ski comprising at least a wear runner 228, the blade comprising at least an aperture 234, the aperture located oppositely the runner or slightly towards the front or towards the back if seen from the side.

The snowmobile wear runner used in combination with two blades 230 carrying apertures 234.

A method to improve the adherence of snowmobile skis during fast turns the method comporting the following steps:
- installing at least a runner 228 and at least a blade 230, the blade comprising a largeness 242 and a blade point 238, the runner comprising a carbide point 239 disposed lower than the blade point,
- practice an aperture 234 in the blade oppositely the runner.

In a concave ski 371 comprising a sliding length and a width comprising a concavity 352 and two bearing wings 323), one on each side of the concavity and spread along the sliding length, the bearing wings comprising each a runner 328, a stabilizer comprising:
- at least a blade 358 disposed vertically and comprising means to adapt inside the concavity, the blade meant to create a path which added to the runners 328, producing at least three parallel furrows.

The snowmobile ski runner used in combination with a concave ski 371 comprising a stabilizer comprising:
- at least a blade 356, 358 disposed vertically and comprising means to adapt inside the concavity, the blade meant to create a path which added to the runners 328, produces at least three parallel furrows.

The snowmobile ski runner used in combination with a snowmobile ski 420 having a sliding side comprising a thick central section 424 and a bearing wing 434 disposed longitudinally on each side of the thick central section, the central section comprising:

a central runner 432 under which is fixed a hard foot 438, a smooth face oriented from the central runner towards the top at an angle from 0 to 60° and prolonging on both sides of the central runner on a short distance in direction of the wings and ending on each side by an edge 444 delimitating an exterior side, two longitudinal knife blades 426, 426' having a low cutting limit 447 and localized in the smooth face near the edge, means of retention 460 to give rigidity to each the knife blade to allow the knives to make paths in the snow, the hard foot being sensibly at the same level as the low cutting limits, permitting to create three close furrows of equal depth in the snow.

The self sharpening central runner localized half-way between the blades and held by slope sides 436 forming a sharp angle with the blade 426, a section of the ski defining a structure in M for the blades 426, the slopes 436 and the hard foot 438, the combination of the blades and the hard foot defining three blades 426, 438, 426' making three furrows at a time and the slopy part 436 serving in reserve for cutting snow by the central runner 432, 438, the blades being oriented to 80±5° from the horizontal when the three blades 426, 438, 426' are moved on a hard surface, the blades in slopes being sharpened on the outside.

A moveable runner 472 having a M or a reversed W shape meant to be added to an existing ski to make it self stabilized, the existing ski comprising in section a low part 468, two wing parts 466 situated one at the left and the other at the right of the low part, two angled parts 469 situated between the low part and either one or the other wing part the moveable runner 472 comprising:

a concave web 474 comprising a central plate 494 and two turned up points 496;

means to unify the central plate 494 to the low part 468 of the ski;

the moveable runner 472 comprising also at the end of the points 496 two knife walls 488 directed towards a low cutting limit 447;

a central runner 478 disposed under the central plate 494 and between the knife walls 488 of sensibly equal depth to the low cutting limit 447, the central runner being sharpened.

A self sharpening runner used in combination with a snowmobile ski comprising a principal body having a superior part and an inferior part;

a central swelling extended longitudinally at the level of the inferior part and covering less than half less of the inferior part and being ended by a pair of edges;

first and second knife blades localized in the central swelling, near the edge, the first and the second blades having cutting sides and the swelling having a bottom possessing centrally a carbide runner, so when the ski gets into contact with a snowy surface, the bottom, the carbide runner and the first and second knife blade being aligned to closely define an M.

The self sharpening runner is sharpened when the snowmobile crosses a road. The road has a gravel side and a hard asphalt center. When passing over gravel both the blade and the support wear mostly the support. On asphalt only the blade wears, the amount of the excess 41 and protects the support as far as the depth 44.

It is well accepted that the embodiment of the present invention which was described above, in reference to the matched drawings, was given indicatively and certainly not limitative, and that modifications and adaptations could be brought without moving away from the object of the present invention. Other embodiments are possible and limited only by the scope of the appended claims.

| LEGEND |
| --- |
| 20-Original runner |
| 22-Carbide bar |
| 25-Curved part |
| 26-Abrasive surface |
| 27-Beveled part |
| 27-Back |
| 28-Wear blade runner |
| 29-Short side |
| 29'-Short side |
| 29-Web |
| 30-Thin sided carbide (Blade) |
| 31-Large side |
| 32-Sheath |
| 34-Thin side |
| 36-Long side |
| 37-Silver foil |
| 38-New position |
| 40-Support |
| 41-Excess |
| 42-Maximum level of wear |
| 43-Runner bevel |
| 44-Depth |
| 45-Blade bevel |
| 46-Shoulder |
| 51-Point |
| 70-Bolts |
| 120-Ski |
| 122-Stabilizer |
| 124-Curved part |
| 126-Front end |
| 130-Lower center channel |
| 132-Carrying sides |
| 134-Carbide bar |
| 136-U shaped section |
| 138-Wings |
| 140-Corrector |
| 141-Resilient section |
| 142-Web |
| 144-Bend |
| 146-Front bolt |
| 147-Back bolt |
| 150-Extension |
| 152-Carbide plates |
| 153-Diamond powder |
| 220-Agessive ski |
| 222-Snowmobile |
| 224-Snow |
| 228-Wear runner |
| 230-Blade |
| 231-Ski support |
| 232-Rear edge |
| 234-Aperture |
| 238-Blade point |
| 240-Front edge |
| 242-Largeness of blade |
| 244-Ski |
| 246-Steering stabilizer |
| 248-Concave ski stabilizer |
| 250-Concave ski |
| 323-Bearing wings |
| 325-Curved end |
| 328-Runner |
| 329-Short flat side |
| 330-Thin sided carbide |
| 331-Large side |
| 332-Sheath |
| 337-Silver foil |

-continued

LEGEND

338-Carbide position
340-Support
352-Concavity
354-Receptacle limits
356-Blade
358-Blade
360-Web
362-Active member
364-Marker
367-Exceeding carbide
370-Bolts
371-Concave ski
420-Ski
422-Sides
424-Thick central section
425-Curved part
426-External knife
426-Blade
428-Beveled front
430-Straight rear
432-Central runner
432-Rear runner
434-Bearing wings
436-Two slope sides
438-Hard foot
440-Flat part
441-Sheath
442-Side
444-Edge
446-Top
447-Low cutting limit
448-External reinforcements
450-Central reinforcements
452-Pockets
454-Aluminum U-channel
456-Plies
458-Bolt rivets
460-Knife attach
462-Cavity
464-Original ski
466-Wing parts
468-Low parts
469-Angled part
470-Low corner
472-Moveable runner
474-Web
475-Sharp angle
476-Bent blades
476'-Bent blades
477-Nuts
478-Central wear runner
480-Curved end
482-Aperture
484-Sharpening slope
488-Knife walls
490-Sharpening
492-Web thickness
493-Weld
494-Central plates
496-Turned up point
500-Slit
502-Flat piece
503-Hidden bolt head
504-Observable bolt head
505-Hole

I claim:

1. A self sharpening runner (28) meant to be fixed to a slide ski face, said self sharpening runner comprising: a rectangular wear blade runner (28) having a high short side (29) upwardly oriented against said slide ski face, two long large sides (31) disposed perpendicularly to said slide ski face and a low short side (29') downward oriented facing the ground, said large (31) and short (29) sides defining a support (40), said low short side (29') of said support comprising a sheath (32), said support having a first hardness; said sheath (32) having two parallel sides disposed from said low side (29') to a depth (44), said sheath receiving a blade (30) having an excess (41) below said low side (29') and having a second hardness of higher magnitude than said first hardness so when said self sharpening runner travels on a hard surface as asphalt or ice, only said blade (30) is in contact and exposed to wearing out, but when said self sharpening runner travels on a penetrable surface, as snow blend with salt, sand, or gravel, both, said blade (30) and said support (40), penetrate said surface and become exposed to abrasion; successive passage of said sliding ski face on a hard and abrasive surface as asphalt roads causing partial abrasion of said runner blade (30) and the passage of said sliding ski face on abrasive matter less harder causing penetration of said blade and of said support (40) and the wearing out of said blade and of said support in inverse proportion of their respective hardness, said excess (41) corresponding to an efficient cut in said hard matter being maintained until complete wearing out of said blade when a ratio of said first hardness compared to said second hardness is chosen for successive passages on hard abrasive surface and penetrable surface, completing a self sharpening and a constant and even cut until complete wearing out.

2. The runner (28) of claim 1 wherein said excess (41) permitting a penetration of its rectangular shape in trail hard snow is of about 2 mm lower than said low short side (29') and possesses a thinness making a sharp knife in an ice trail meant to create a deep furrow and to procure an efficient direction while in use until complete wearing of said runner.

3. The self sharpening runner of claim 1 wherein said hardness ratio of said blade comparing to the support goes around 1.3 and 2.4, said carbide blade (30) being of a hardness greater than 50 Rc.

4. The runner of claim 3 wherein the thickness of said blade is a quarter to a third of the width of said wear low short side (29').

5. The runner of claim 4 wherein said blade (30) is about 2 mm when said low short side (29') is about 6 mm.

6. The self sharpening runner of claim 1 used in combination with a stabilizer (122) having a front (126) and a long body installed longitudinally under said slide ski surface, said stabilizer comprising: a pair of cutting elements comprising two thin blades disposed externally of said snowmobile ski runner, all three elements being positioned below said ski, with said centre element comprising means for bearing over hard passages for preventing wear of said thin blades, said stabilizer comprising means at said front (126) to flatten snow between said two thin blades, said stabilizer comprising a slide surface for longitudinal sliding between said two blades; the combination of said three cutting elements in said flattened snow forcing the snow along said longitudinal sliding, thereby diminishing side swaying.

7. The self sharpening runner (228) of claim 1 used in combination with: a snowmobile ski (220) comprising at least a blade (230) and at least a wear runner (228) and a central ski support (231).

8. The snowmobile wear runner of claim 1 used in combination with two blades (230) carrying apertures (234), said blades being mounted in a ski.

9. The snowmobile ski runner of claim 1 used in combination with a concave ski (371) comprising a stabilizer comprising: at least a blade (356, 358) disposed vertically and comprising means to adapt inside said concavity, said blade meant to create a path which added to said runners (328), produces at least three parallel furrows.

10. The snowmobile ski runner of claim 1 used in combination with a snowmobile ski (420) having a sliding side and comprising a thick central section (424) and a bearing wing (434) disposed longitudinally on each side of said thick central section, said central section comprising: a central runner (432) under which is fixed a hard foot (438), a smooth face oriented from said central runner towards the top at an angle from 0 to 60 degrees and prolonging on both sides of said central runner on a short distance in direction of said wings and ending on each side by an edge (444) delimitating an exterior side, two longitudinal knife blades (426, 426') having a low cutting limit (447) and localized in said smooth face near said edge, means of retention (460) to give rigidity to each said knife blade to allow the knives to make paths in the snow, said hard foot being sensibly at the same level as said low cutting limits, permitting to create three close furrows of equal depth in said snow.

11. The ski of claim 1 wherein said self sharpening central runner is localized half-way between said blades and is held by slope sides (436) forming a sharp angle with said blade (426), a section of said ski defining a M-shaped structure for said blades (426), said slopes (436) and said hard foot (438), the combination of said blades and said hard foot defining three blades (426, 438, 426') making three furrows at a time and said sloppy part (436) serving in reserve for cutting snow by said central runner (432, 438), said blades being oriented to 80±5 degrees from the horizontal when said three blades (426, 438, 426') are moved on a hard surface, said blades in slopes being sharpened on the outside.

12. The self sharpening runner of claim 1 in combination with a snowmobile ski comprising a principal body having: a superior part and an inferior part; a central swelling extended longitudinally at the level of said inferior part and covering less than half of the inferior part and being ended by a pair of edges; first and second knife blades localized in said central swelling, near said edge, said first and said second blades having cutting sides and said swelling having a bottom possessing centrally a carbide runner (478), so when said ski gets into contact with a snowy surface, said bottom, said carbide runner and said first and second knife blade (488) being brought near contacting said snowy surface to form a M-shape.

* * * * *